United States Patent [19]

Viegas

[11] Patent Number: 4,635,671
[45] Date of Patent: Jan. 13, 1987

[54] FLOW AND PRESSURE CONTROL VALVE SYSTEM

[75] Inventor: Herman H. Viegas, Bloomington, Minn.

[73] Assignee: Thermo King Corporation, Minneapolis, Minn.

[21] Appl. No.: 765,737

[22] Filed: Aug. 14, 1985

[51] Int. Cl.[4] .............................................. F16D 25/14
[52] U.S. Cl. ................................. 137/102; 137/107; 137/116; 91/461; 192/85 R
[58] Field of Search ................... 137/102, 118, 625.67, 137/625.6, 625.66, 116, 538, 107; 192/85 R, 3.57; 91/461

[56] References Cited

U.S. PATENT DOCUMENTS

| 1,053,382 | 2/1913 | Haennig | 137/107 |
| 1,454,409 | 5/1923 | Richter | 137/538 X |
| 1,540,886 | 6/1925 | Huff | 137/102 |
| 3,272,218 | 9/1966 | Johnson | 137/102 |
| 3,335,738 | 8/1967 | Christensen et al. | 137/102 |
| 3,606,904 | 9/1971 | Taylor | 137/102 |
| 3,696,839 | 10/1972 | Irie | 137/625.61 |
| 3,949,847 | 4/1976 | Hoehn | 137/625.6 X |
| 4,281,676 | 8/1981 | Morris | 137/102 |
| 4,378,816 | 4/1983 | Peiffer | 137/116 |
| 4,531,547 | 7/1985 | Hadden | 137/625.6 X |

FOREIGN PATENT DOCUMENTS

| 132095 | 6/1951 | Sweden | 137/107 |
| 923745 | 4/1963 | United Kingdom | 137/107 |
| 235264 | 5/1969 | U.S.S.R. | 137/625.61 |

Primary Examiner—Martin P. Schwadron
Assistant Examiner—Stephen M. Hepperle
Attorney, Agent, or Firm—E. C. Arenz

[57] ABSTRACT

A flow and pressure control valve system is provided in which a control valve body 18 has a bore 22 therein with a slidable piston 24, the piston being biased to the left by spring 32 to a stop 38, with ports 16 and 26 opening to the bore 22 in the pressure end portion of the bore, the port 16 being connected to a positive displacement pump 28 and the port 26 connected to a reservoir 30 through a two-way valve, a third port 40 being connected to an actuatable device 10 and a fourth port 42 being connected to the reservoir 30 and functioning as a pressure regulator port after the two-way valve 28 is closed, and the piston 24 is retracted to the right as in FIG. 2 so that the device 10 is first actuated, and the pressure is then regulated by the relation of the piston 24 to the pressure regulator port 42.

4 Claims, 5 Drawing Figures

FLOW AND PRESSURE CONTROL VALVE SYSTEM

BACKGROUND OF THE INVENTION

This invention relates to a flow and pressure control valve system particularly designed for use with a two-speed transmission used in transport refrigeration units.

U.S. patent application Ser. No. 06/741,092 filed June 4, 1985 (W.E. 52,541) discloses a two-speed transmission used with transport refrigeration units which functions to permit driving a refrigerant evaporator fan at a higher speed than the refrigerant condenser fan. In that application, and as shown in a schematic embodiment of FIG. 4 of that application, a three-way valve under the control of a solenoid controls the output of a fluid pump in accordance with the particular position of the valve. The arrangement shown also requires the use of a separate pressure regulator in the system.

It is the aim of my invention to provide a flow and pressure control valve system in which a single valve of the design according to the invention performs various functions in conjunction with a separate two-way control valve. These functions include directing high-pressure fluid when required to a device such as a piston in a cylinder for shifting the transmission speed, controlling the system pressure within predetermined limits, and rapidly relieving pressure from the device when the pressure is no longer required, such rapid release of pressure being important in some applications. Additionally, the flow and pressure control system of the invention is less expensive and more reliable since the control valve is of relatively simple construction and easily manufactured, and the control valve, along with a separate two-way valve, replaces a three-way solenoid valve and a separate pressure regulator, the control valve itself having no more parts than a conventional pressure regulator.

SUMMARY OF THE INVENTION

In accordance with the invention, a flow and pressure control system for controlling the flow and pressure of fluid to be selectively supplied to an actuatable device from a positive displacement pump includes a fluid reservoir from which the pump draws fluid, control valve means including a body having an axial bore with an axially movable piston therein, means biasing the piston toward the pressure end portion of the bore, first and second ports, opening to the bore, in the pressure end portion, the pump having its discharge connected to the first port, and means including a two-way valve connecting the second port to the reservoir, stop means preventing the piston from moving to a position blocking the first and second ports, a third radial port, opening to the bore, in communication with the actuatable device, a fourth radial port, opening to said bore, in communication with the reservoir, the third and fourth ports being located, along the axial length of the bore and relative to the movable path of the piston, such that the third and fourth ports are out of communication with the pressure end portion of the bore when the piston is in its stop position with the two-way valve open, and the third and fourth ports further being axially located, relative to each other, such that the third and fourth ports are successively placed in communication with the pressure end portion as the piston is progressively retracted against the spring with the two-way valve closed, so that the actuatable device is first actuated by the fluid pressure and the fluid pressure is then regulated in accordance with the position of the piston relative to the fourth port.

DESCRIPTION OF THE PREFERRED EMBODIMENT

Figure 1:
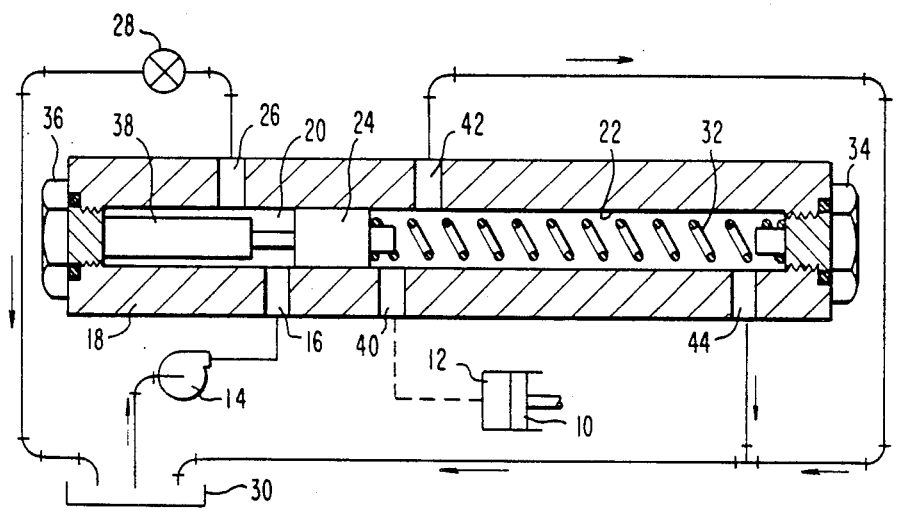
FIGS. 1 and 2 are partly schematic, longitudinal sectional views of the control valve in the flow and pressure control system with the system pressure being unloaded in FIG. 1, and the system being loaded in FIG. 2.

Referring to FIGS. 1 and 2, 10 and 12 identify the piston and cylinder comprising the pressure actuatable device corresponding to the piston and cylinder of the two-speed transmission of the noted patent application which should be referred to for details not described herein. A pump 14 is schematically shown which has its discharge connected to a first port 16 in the control valve body 18, this port opening into the pressure end portion 20 of an axial bore 22 which extends for most of the axial length of the control valve. The pressure end portion 20 of the bore is that part which is to the left of the axially movable piston 24, irrespective of the particular position of the piston.

A second port 26 opening into the pressure end portion 20 of the bore is connected through a two-way valve 28 to the fluid reservoir 30.

The piston 24 is biased to the left or toward the pressure end portion 20 by a compression spring 32. One end of this spring seats against the closure cap 34 for the bore and the other end seats against the piston 24. The spring is selected to provide a particular system pressure as desired. The other end of the bore is provided with a cap 36 which carries a stop element 38 projecting axially into the bore for a distance sufficient that with the piston 24 resting against the stop in the unloaded mode of operation, both the first and second ports are unobstructed by the piston.

A third radial port 40 opens into the bore at a location which is to the right of the piston 24 in the unloaded mode. This port 40 connects to the actuatable device, the piston 10 in cylinder 12.

A fourth radial port 42 also opens into the bore from a location to the right of the piston 24 in the unloaded mode, this port 42 being connected to the reservoir 30 and functioning as a pressure regulator port. Finally, in the schematic embodiments of the arrangement of FIGS. 1 and 2, a relief port 44 is provided and is connected to reservoir 30 to permit the relief of fluid from the bore to the right of the piston when the piston is being moved to its pressure loaded position as shown in FIG. 2.

The locations of the first through fourth ports along the axial length of the bore 22 are important. First, in the fully extended position of the piston to the left as in FIG. 1, both the first and second ports 16 and 26 remain unobstructed by the piston 24. The third and fourth ports 40 and 42 are further located, relative to each other that the third and fourth ports are successively placed in communication with the pressure end portion 20 of the bore as the piston is progressively retracted against the spring 32. This is so that the actuatable device 10 is first actuated by the fluid pressure through the third port 40 by this port opening first, and the fluid pressure is then regulated through the port 42 in accordance with the position of the piston 24 relative to that fourth port.

The way in which the schematic embodiment of FIGS. 1 and 2 operates is as follows. With the system as in FIG. 1 in an unloaded pressure mode, that is, the actuatable device 10 is not to be actuated, the pump 14 draws fluid from the reservoir 30 and pumps it through the first port 16, with the fluid being passed through the second port 26 and through the open two-valve 28 to the reservoir. Under such a condition, the positive displacement pump basically generates only sufficient pressure to overcome the resistance of the flow path from the pump discharge back to the reservoir 30 through the open two-way valve 28, such a pressure perhaps being 3 to 5 psi. (21 to 30 E+03 Pa) in the currently preferred embodiment. When the actuatable device 10 is to be actuated so as to shift the overdrive transmission, the two-way valve 28 is closed and the pressure in the pressure end portion 20 of the bore rapidly rises to push the piston 24 to the right against the force of the spring. This will drive the piston toward the FIG. 2 position in which the piston first opens the third port 40 to actuate the device with the piston then advancing further against the spring to partly open the pressure regulator or fourth port 42. Thus, the device is first fully actuated before the piston 24 moves to a pressure regulating position. The spring is selected so that at whatever pressure is desired to operate the actuatable device, such as 90 psi. (620 E+03 Pa), that pressure and the spring will balance themselves so that the flow back to the reservoir through the pressure regulator or fourth port 42 is at a rate to maintain such a pressure. Then, when the device is to be deactuated and the system placed in the unloaded condition, the two-way valve 28 is opened so that pump pressure drops and the piston 24 will move to the left to the FIG. 1 position. In this position, it will be seen that the third port 40 is fully open to relieve the fluid from the cylinder 12 back to the reservoir 30.

Figure 2:
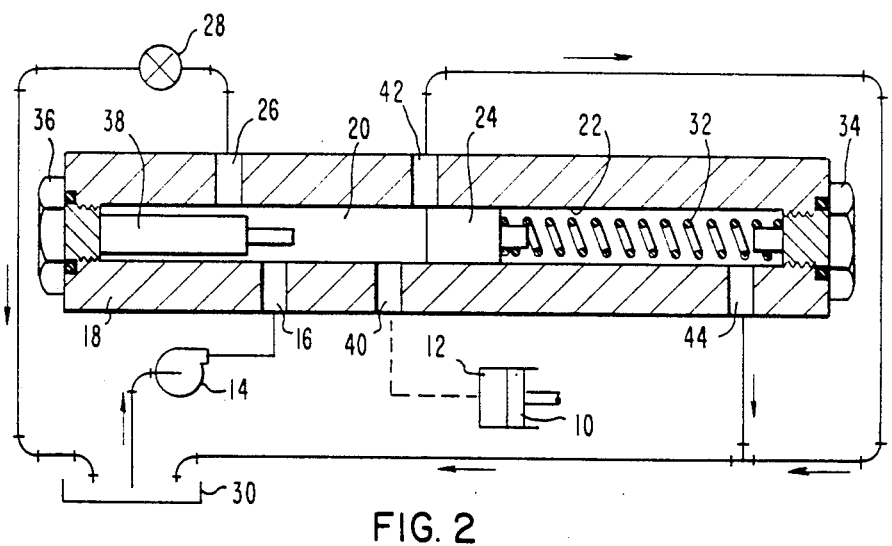
Figure 3:
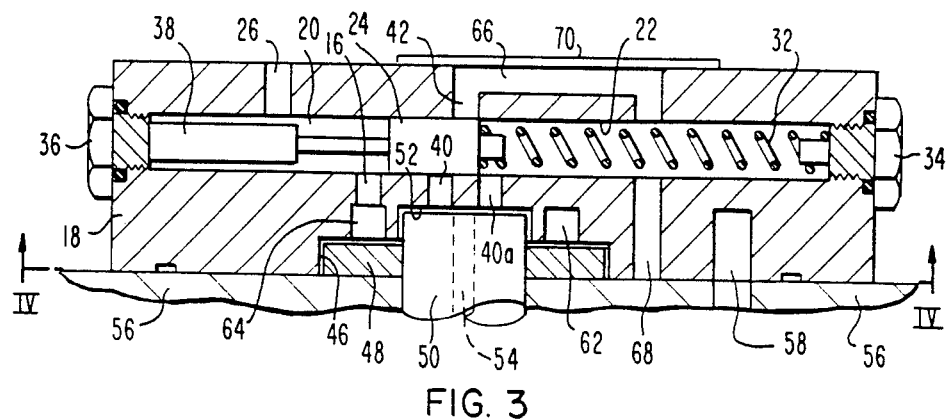
FIG. 3 is a longitudinal section through a control valve having the actual construction as currently preferred, this valve being shown in the unloaded mode.
Figure 4:
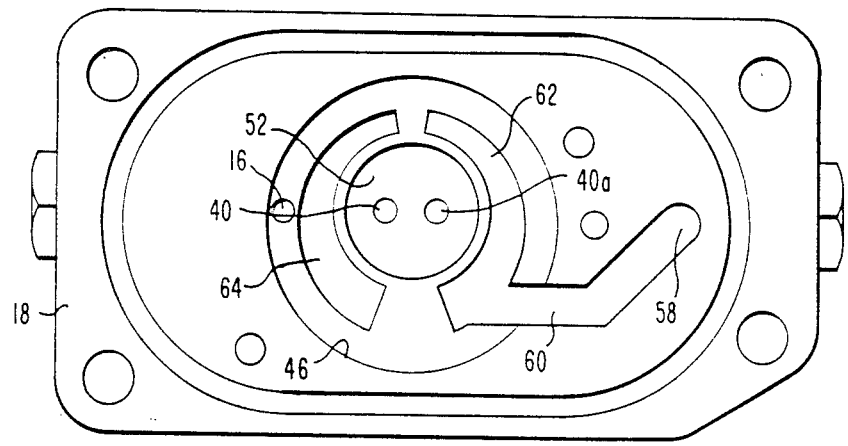
FIG. 4 is a face view of the control valve taken along the line IV—IV of FIG. 3.
Figure 5:
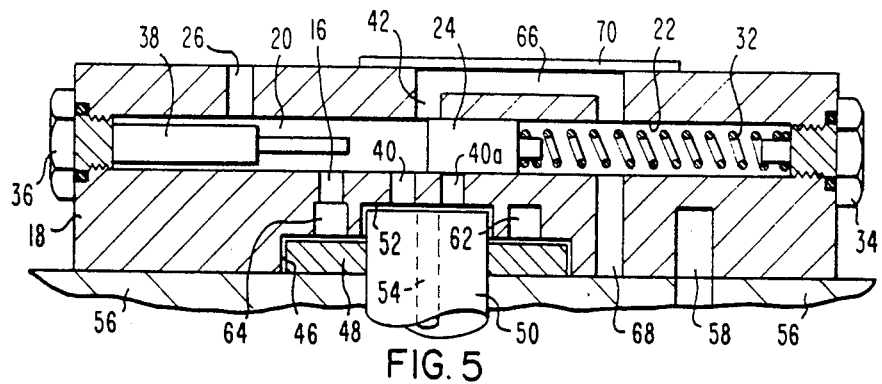
FIG. 5 is a view of the control valve of FIG. 3 in the pressure loaded mode.

FIGS. 3-5 illustrate the currently preferred form that the control valve takes for use with the two speed transmission, with equivalent parts of FIGS. 3-5 being identified by the same numerals as in FIGS. 1 and 2. This particular embodiment differs in a few respects from what is shown in FIGS. 1 and 2, principally because the form of the control valve is dictated in part by the constraints of its application to the particular two-speed transmission with which it is to be used and which is described in detail in the noted patent application. The overall shape of the valve of FIGS. 3-5 is generally rectangular with the bore 22 being drilled from end to end and then capped as shown by caps 34 and 36. A relatively large circular recess 46 is formed in the lower face (FIG. 3) of the body 18, this recess ultimately receiving a gerotor pump impeller 48 on the pump shaft 50, whose end is received in a somewhat smaller circular recess 52 with clearance between the end of the shaft and the facing surface of the recess 52. The shaft 50 is provided with an internal passageway 54 which leads from the circular recess 52 to the device to be actuated, as is more fully shown in the noted patent application which is hereby incorporated by reference. The lower face of the control valve of FIG. 3 is secured to a transmission housing face 56 which is in abutting relation. The passage of fluid to the suction side of the pump from the reservoir is through an internal passage 58 in the housing and through an internal passage 60 in the control valve block to what is called a suction kidney 62 because of its arcual shape. When the impeller 48 is rotated, a pressure is produced by the impeller in the discharge kidney 64 which is in communication with the first port 16 which, in turn, is in communication with the pressure end portion 20 of the control valve.

For manufacturing economy and because of constraints with respect to the size for the given application of the control valve, a slot 66 is formed in the upper face of the control valve body to connect the regulator port 42 to a hole 68 drilled through the block from face to face, this hole connecting to an internal passageway in the housing faceplate 56 which leads to the reservoir 30. The groove 66 at the upper face of the valve body is sealed with a plate 70 and gasket. Additionally, because of the dimensional restraints, two holes 40 and 40a are provided between the clearance space at the end of the shaft 50 and the bore. The reason for this is that when the valve is in the unloaded mode as in FIG. 3, the fluid which is returned or relieved from the actuated device passes into this clearance space and then through 40a to the valve bore 22 for passage through the hole 68 back to the reservoir. It will be seen in FIG. 3 that in the unloaded mode the hole 40 is blocked by the piston 24. In the pressureloaded mode as shown in FIG. 5, the bore 40a is blocked by the piston but the bore 40 to the pressure end portion 20 of the bore is open so that full pressure can be delivered through the hollow shaft to the actuating device.

It will be seen in the construction that the main bore 22 can be drilled from end to end, and each of the radially extending bores porting at the main bore can be drilled from either the right or left face, thus simplifying manufacturing.

I claim:

1. A flow and pressure control system for controlling the flow and pressure of the fluid to be selectively supplied to an actuatable device from a positive displacement pump, comprising:

a fluid reservoir from which said pump draws fluid;
control valve means including a body having an axial bore with an axially movable piston therein;
means biasing said piston toward one pressure end portion of said bore;
first and second ports, opening to said bore, in said one pressure end portion;
said pump having its discharge connected to said first port;
means including a two-way valve connecting said second port to said reservoir;
stop means preventing said piston from moving to a position blocking said first and second ports;
third radial port means, opening to said bore, in communication with said actuatable device;
fourth radial port means, opening to said bore, in communication with said reservoir;
said third and fourth port means being located, along the axial length of said bore and relative to the movable path of said piston, such that said third and fourth port means are out of communication with said one pressure end portion of said bore when said piston is in its stop position with said two-way valve open; and said third and fourth port means further being axially located, relative to each other, such that said third and fourth port means are successively placed in communication with said one pressure end portion as said piston is progressively retracted against said spring with said two-way valve closed, so that said actuating device is first actuated by the fluid pressure and the fluid pressure is then regulated in accordance with the position of said piston relative to said fourth port means.

2. A system according to claim 1 wherein:

said third and fourth port means are still further located so that full open communication to said actuatable device occurs through said third port means as said piston is retracted before said fourth port means begins to open to the bore.

3. A system according to claim 1 wherein:

said third and fourth port means are in communication with each other when said piston is at its stop position to permit fluid to bleed back from said actuatable device to said reservoir.

4. A pressure and flow control valve adapted to have connections to a fluid pump, a fluid reservoir and an actuable device, comprising:

a valve body in the form of an elongated block having one and an opposite side faces and having an axial bore extending from end to end;

one and an other end cap closing both ends of said bore;

an axially movable piston in said bore;

biasing means urging said piston toward one end of said bore;

stop means carried by said other end cap to limit movement of said piston to an extended position in said bore;

first and second transverse bores extending from externally of said faces to open to that portion of said axial bore beyond said extended position of said piston, one of said first and second bores being adapted to be connected to said pump and the other to said reservoir;

third transverse bore means extending from externally of said one face to open to that portion of said axial bore between said one end cap and said piston when said piston is in said extended position and opening to that portion of said axial bore between said piston and said other end cap when said piston is in a retracted position, said third bore being adapted to be connected to said actuatable device;

fourth transverse bore means extending from externally of said opposite face to open to said axial bore at a location placing said fourth bore in communication with that portion of said axial bore between said piston and said other end cap when said piston is in said retracted position, said fourth bore being adapted to be connected to said reservoir; and fifth transverse bore means extending from externally of a said one face to open to said axial bore at a location between said piston and said one end cap irrespective of which position said piston is in, said fifth bore being adapted to be connected to said reservoir.

* * * * *